US008261234B1

(12) United States Patent
Aarts et al.

(10) Patent No.: US 8,261,234 B1
(45) Date of Patent: Sep. 4, 2012

(54) SYSTEM, METHOD, AND COMPUTER PROGRAM PRODUCT FOR COMPILING CODE ADAPTED TO EXECUTE UTILIZING A FIRST PROCESSOR, FOR EXECUTING THE CODE UTILIZING A SECOND PROCESSOR

(75) Inventors: Bastiaan J. M. Aarts, San Jose, CA (US); Ian A. Buck, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1238 days.

(21) Appl. No.: 12/032,291

(22) Filed: Feb. 15, 2008

(51) Int. Cl.
*G06F 9/44* (2006.01)
(52) U.S. Cl. .......................... 717/106; 703/7
(58) Field of Classification Search .................. 717/140, 717/136
See application file for complete search history.

(56) References Cited

U.S. PATENT DOCUMENTS

| | | | | |
|---|---|---|---|---|
| 6,973,644 B2* | 12/2005 | Nylander et al. | ............. | 717/139 |
| 7,191,433 B2* | 3/2007 | Narad et al. | .................. | 717/140 |
| 7,450,131 B2* | 11/2008 | Swamy et al. | ................ | 345/565 |
| 7,509,244 B1* | 3/2009 | Shakeri et al. | .................... | 703/7 |
| 7,703,088 B2* | 4/2010 | Li et al. | ......................... | 717/159 |
| 7,801,719 B2* | 9/2010 | Boskovic et al. | ............... | 703/19 |
| 7,810,081 B2* | 10/2010 | Dickenson et al. | ........... | 717/140 |
| 7,941,791 B2* | 5/2011 | Wang et al. | .................... | 717/140 |
| 2005/0193378 A1* | 9/2005 | Breault | ........................ | 717/140 |
| 2008/0178163 A1* | 7/2008 | Gschwind et al. | ............ | 717/140 |
| 2009/0064095 A1* | 3/2009 | Wallach et al. | ............... | 717/106 |

OTHER PUBLICATIONS

U.S. Appl. No. 11/556,057, filed Nov. 2, 2006.

* cited by examiner

*Primary Examiner* — Don Wong
*Assistant Examiner* — Mohammad Kabir
(74) *Attorney, Agent, or Firm* — Zilka-Kotab, PC

(57) ABSTRACT

A system, method, and computer program product are provided for compiling code adapted to execute utilizing a first processor, for executing the code utilizing a second processor. In operation, code adapted to execute utilizing a first processor is identified. Additionally, the code is compiled for executing the code utilizing a second processor that is different from the first processor and includes a central processing unit. Further, the code is executed utilizing the second processor.

15 Claims, 6 Drawing Sheets

SYSTEM, METHOD, AND COMPUTER PROGRAM PRODUCT FOR COMPILING CODE ADAPTED TO EXECUTE UTILIZING A FIRST PROCESSOR, FOR EXECUTING THE CODE UTILIZING A SECOND PROCESSOR

FIELD OF THE INVENTION

The present invention relates to compilers, and more particularly to compiling code for executing the same on a particular platform.

BACKGROUND

Traditionally, programming environments for graphics processing units (GPUs) have been domain specific solutions targeted at generating images. Until recently, developing programs for general purpose computation on general purpose GPUs (GPGPUs) has been inefficient for various reasons. One of these reasons is a lack of proper debugger support associated with the GPU. For example, current GPUs lack proper support for debuggers which are used to step through and debug code to be executed. Additionally, current GPUs lack proper manual debugging support such as the ability to prim debug messages and errors while manually stepping through code to be executed.

In general, GPUs have had very limited support to use native debuggers. Now that more effort is going into making GPGPU programming more accessible, this is rapidly changing. However, it will be a while before GPU native debugger support will have the same functionality as host debuggers.

Until recently, developers have generally had to resort to low level debugger support that is provided by hardware simulators. However, hardware simulators are often bulky and often are inaccessible to developers. There is thus a need for addressing these and/or other issues associated with the prior art.

SUMMARY

A system, method, and computer program product are provided for compiling code adapted to execute utilizing a first processor, for executing the code utilizing a second processor. In operation, code adapted to execute utilizing a first processor is identified. Additionally, the code is compiled for executing the code utilizing a second processor that is different, from the first processor and includes a central processing unit. Further, the code is executed utilizing the second processor.

DETAILED DESCRIPTION

Figure 1:
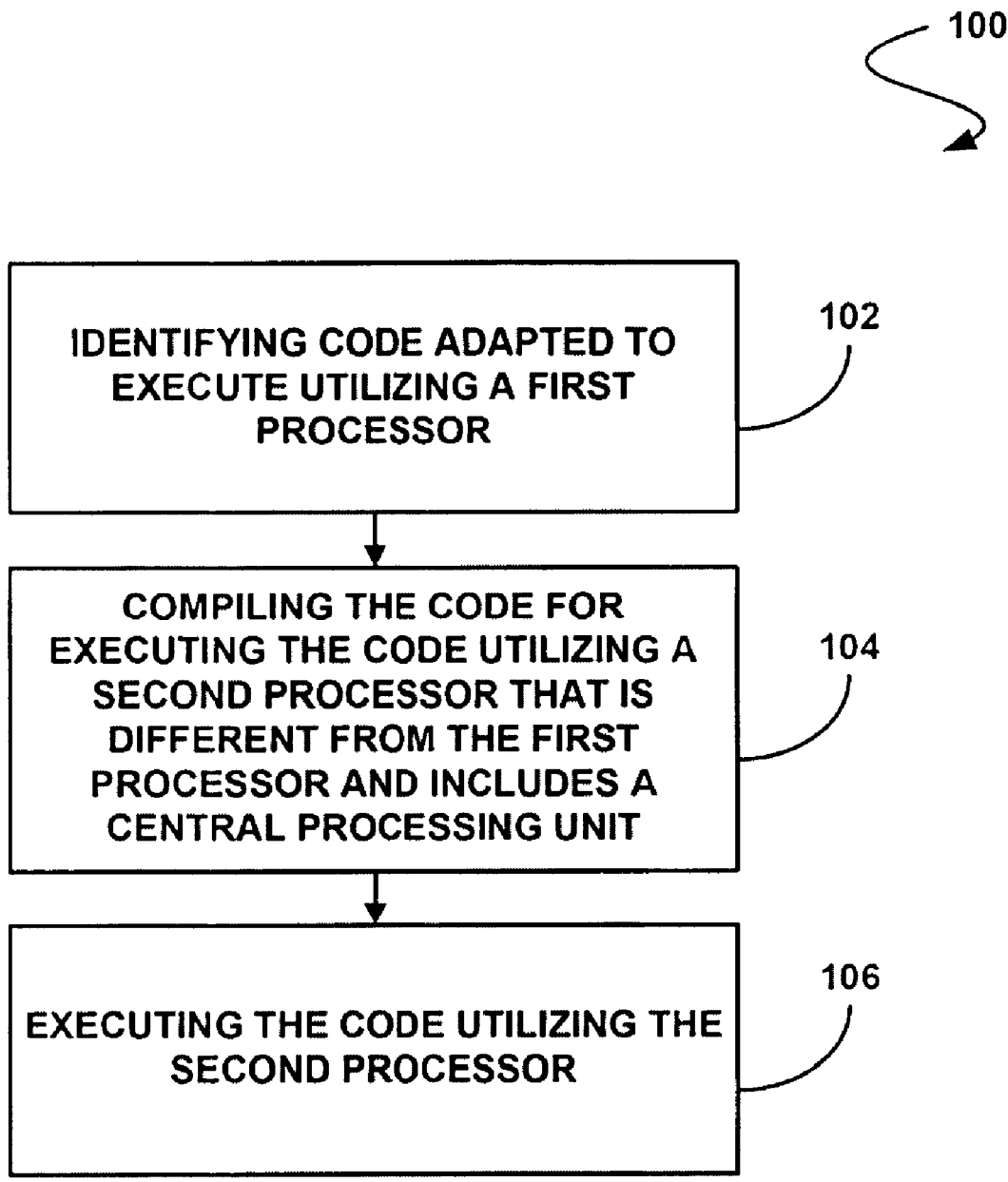
FIG. 1 shows a method for compiling code adapted to execute utilizing a first processor, for executing the code utilizing a second processor, in accordance with one embodiment.

FIG. 1 shows a method 100 for compiling code adapted to execute utilizing a first processor, for executing the code utilizing a second processor, in accordance with one embodiment. As shown, code adapted to execute utilizing a first processor is identified. See operation 102.

Additionally, the code is compiled for executing the code utilizing a second processor that is different, from the first processor and includes a central processing unit (CPU). See operation 104. Further, the code is executed utilizing the second processor. See operation 106.

In the context of the present description, a processor refers to any processor capable of executing code. For example, in various embodiments, the processor may include, but are not limited to, central processors, micro processors, graphics processors, and/or any other processor that meets the above definition. Additionally, in one embodiment, the first and/or the second processor may include a parallel processing architecture in this case, the parallel processing architecture may include a graphics processor.

Further, in the context of the present description, code refers to any computer code, instructions, and/or functions that may be executed using a processor. For example, in various embodiments, the code may include C code, C++ code, etc. in one embodiment, the code may include a language extension of a computer language (e.g. an extension of C, C++, etc.).

Still yet, in the context of the present description, executing the code may include any processing of the code. For example, in various embodiments, executing the code my include running the code, debugging the code, and/or any other execution of the code.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
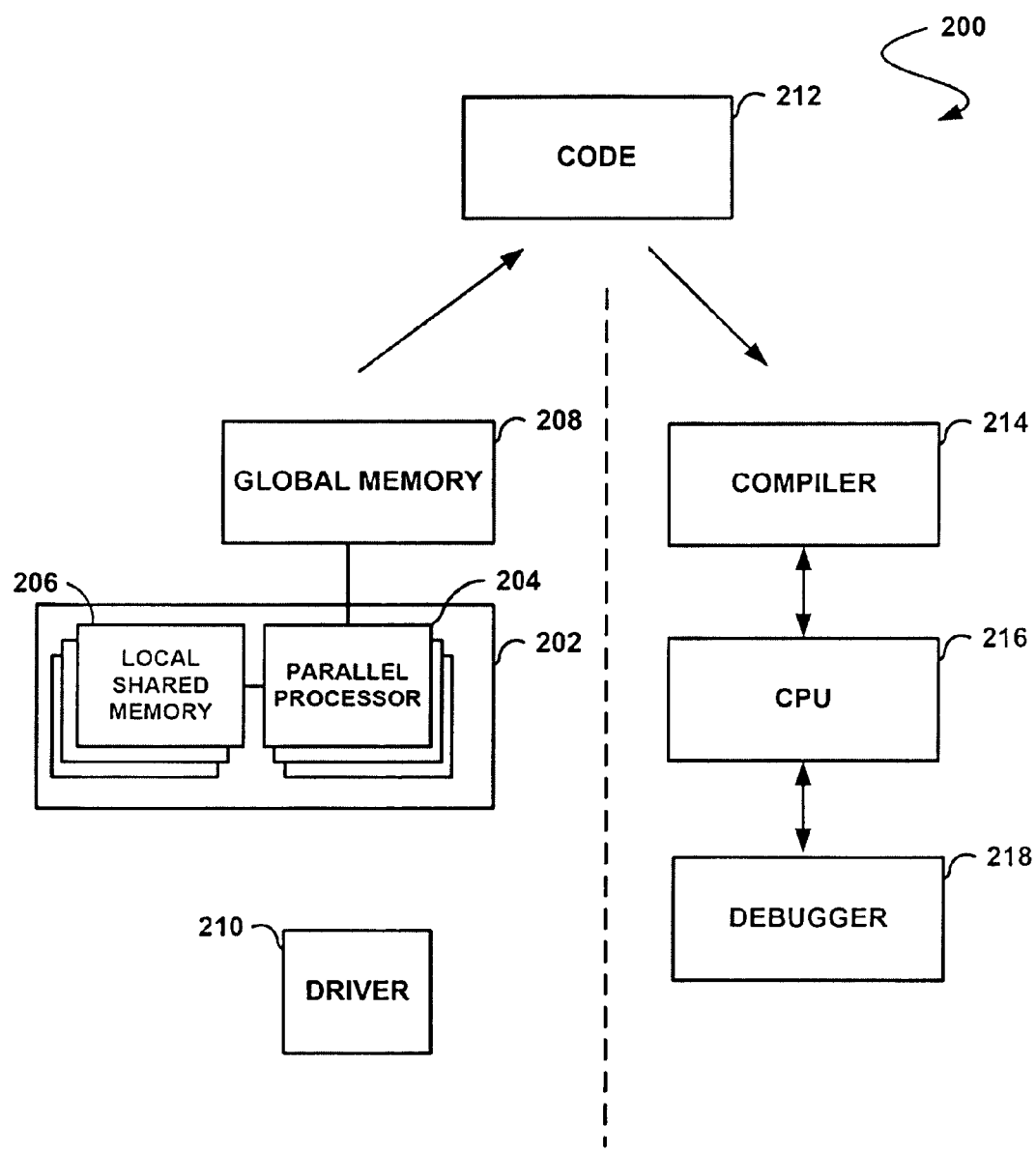
FIG. 2 shows a system for compiling, code adapted to execute utilizing a first processor, for executing the code utilizing a second processor, in accordance with one embodiment.

FIG. 2 shows a system 200 for compiling code adapted to execute utilizing a first processor, for executing the code utilizing a second processor, in accordance with one embodiment. As an option, the present system may be implemented to carry out the method of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

In one embodiment, the parallel processing architecture may include one or more single instruction multiple data (SIMD) processing elements. In such a system, the threads being executed by the processor are collected into groups such that at any instant in time all threads within a single group are executing precisely the same instruction but on potentially different data. In one embodiment, this group of threads operating in such fashion may be referred to as a cooperative thread array (CTA). Further, the predetermined number of threads in such a group may be referred to as the CTA size of the corresponding processor.

In another embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture may include local shared memory 206. Each of the parallel processors of the parallel processing architecture may read and/or write to its own local shared memory. This shared memory may consist of physically separate memories associated with each processor or it may consist of separately allocated regions of one or more memories shared amongst the processors.

Further, in the illustrated embodiment, the shared memory may be embodied on an integrated circuit on which the processors of the parallel processing architecture are embodied. Still yet, global memory 208 is shown to be included. In use, such global memory is accessible to all the processors of the parallel processing architecture.

As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein.

Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation. In use, the driver may be used to control an operation in accordance with the method of FIG. 1.

In operation, code 212 adapted to execute utilizing the parallel processor may be identified. The code may then be compiled using a compiler 214 for executing the code utilizing a second processor that includes a central processing unit 216. In this case, compiling the code refers to translating the code written in a computer language (e.g. a source code) into another computer language (e.g. an object code).

In one embodiment, the code may be translated prior to the compilation. For example, the code may be configured to run on the parallel processor using a first computer language. The first computer language may then be translated into a second computer language such that the second language may be compiled using a compiler associated with the second processor.

In this way, the compiling may be carried out by the compiler for compiling code adapted to execute on the second processor. Thus, the translating may enable the identified code to be compiled by the compiler. In one embodiment, a software stub may be generated as a result of the translating. For example, the translating may include translating a function which results in at least one software stub. In this case, the software stub may include a plurality of runtime calls.

Once the code is compiled, the code may be executed utilizing the second processor. In one embodiment, the execution of the code utilizing the second processor may include managing a plurality of parallel threads. In this case, the managing may include executing at least a portion of a first parallel thread. In addition, the managing may further include pausing an execution of a second parallel thread until the execution of at least the portion of the first parallel thread is complete.

The code may also be debugged during the execution of the code utilizing the second processor. In this case, the debugging may be implemented using a debugger 218 associated with the second processor. In one embodiment, the debugging may be implemented utilizing multiple debuggers associated with the second processor.

Additionally, in various embodiments, the debugging may include a real-time feature, an error message feature, and a simulation feature. For example, the debugging may include using a real-time debugger which debugs code that is being, or is to be executed. Additionally, the debugging may include outputting error messages using the real-time debugger and/or a manual debugging routine. Furthermore, the debugging may include simulating hardware such that the code may be debugged.

Figure 3:
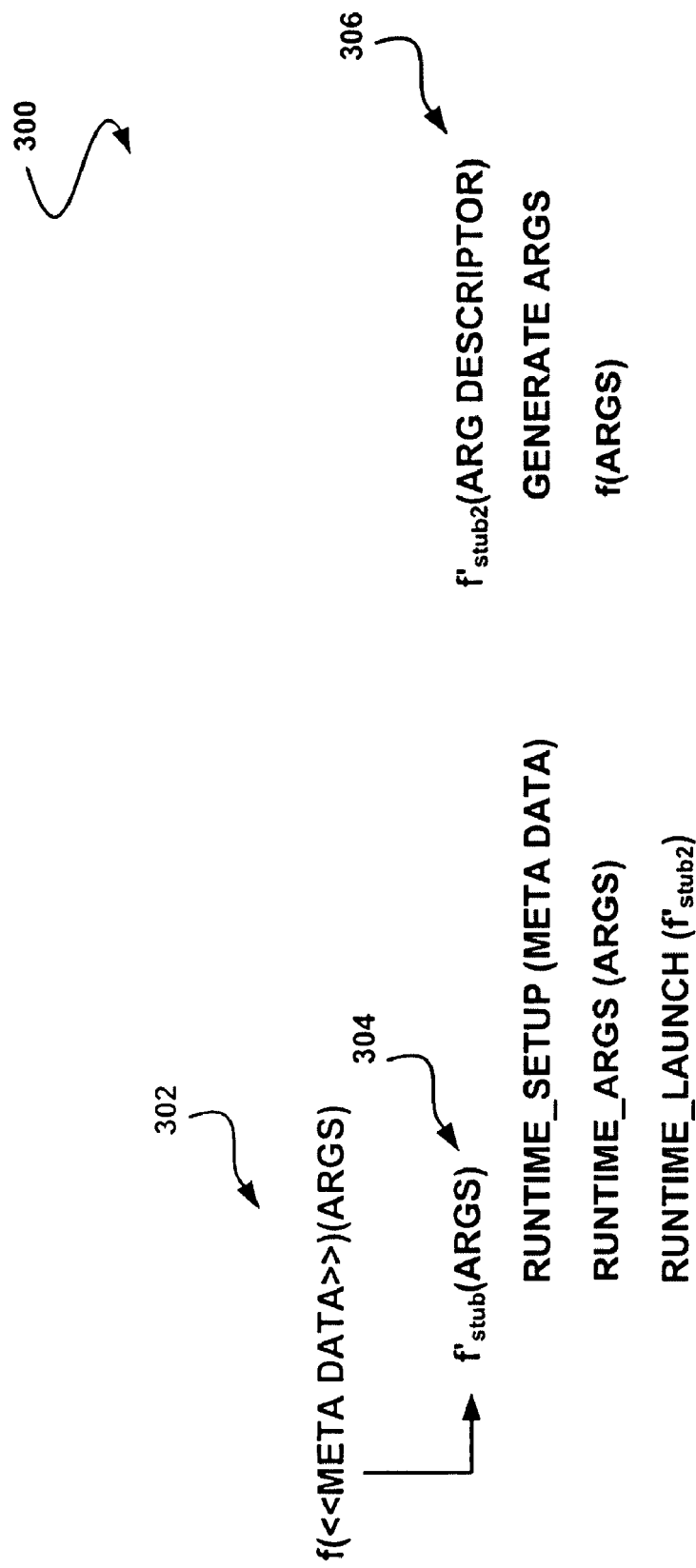
FIG. 3 shows a method of translating code prior to compilation, in accordance with one embodiment.

FIG. 3 shows a method 300 of translating, code prior to compilation, in accordance with one embodiment. As an option, the present method may be implemented in the context of the details of FIGS. 1-2. Of course, however, the method may be implemented in any desired environment. Again, the aforementioned definitions may apply during the present description.

As shown, a software function 302 capable of operating various arguments, may be translated into a first software stub 304, capable of operating on some or all of the arguments. As shown further, the function may include metadata. In one embodiment, this metadata may include information associated with one or more threads and/or processors to execute the function. For example, the metadata may include a number of groups of threads to execute the function as well as the number of threads within these groups.

As shown further, the first software stub may include a plurality of runtime calls. In various embodiments, these runtime calls may include runtime calls for metadata setup, argument processing/generation, and calls to other functions. In one embodiment, the runtime calls may include a call to register a call back function to a second stub 306 with the runtime.

In this case, the second stub may include additional runtime calls. As an option, such runtime calls may include data setup, argument generation, and calls to other functions, in one embodiment, the second software stub may include a call to the main software function.

More information regarding translating functions into software stubs including runtime calls may be found in U.S. patent application Ser. No. 11/556,057 entitled C/C++ Language Extensions for General-Purpose Graphics Processing Unit, filed on Nov. 2, 2006, which is incorporated herein by reference in its entirety.

By using this technique, code configured to be executed using a first processor may be translated into code capable of being executed a second processor. In one embodiment, this may include translating an extension of a computer language (e.g. C, C++, etc.) associated with a GPU (e.g. a general purpose GPU, etc.) into a standard computer language associated with a CPU (e.g. C, etc.) such that a compiler and/or debugger associated with the CPU may be utilized to compile/debug code associated with the GPU.

This allows a native emulation framework for GPU accelerated applications to be implemented, such that developers may use a debugger of their choice to debug an application. For example, language extensions may be utilized to augment C programming language in a way that enables compilation for the GPU.

Since additions utilized to augment the C programming language are minimal, the additions may be mapped back to traditional C, such that the resulting code may be compiled with a native C compiler. The resulting executable may then be linked against a library that emulates an execution model of the GPU. In this way, an application may execute as if it were being executed on the GPU with full debugger support. More information regarding the utilization of language extensions for GPUs may be found in U.S. patent application Ser. No. 11/556,057 entitled C/C++ Language Extensions for General-Purpose Graphics Processing Unit, filed on Nov. 2, 2006, which has been incorporated by reference in its entirety.

Because the code that is accelerated by the GPU is compiled with a native compiler, the code may execute on a host. This enables usage of other native tools e.g. the native debugger), which is useful for developing large programs. Additionally, because the code that is accelerated by the GPU is compiled with a native compiler, the code may include code that is typically not able to execute on a GPU. This may enable the use of I/O routines for debugging, purposes, for example.

Furthermore, because the code that is accelerated by the GPU executes on the host instead of a simulator, execution times may be faster. Also, the emulation framework is very small compared to a simulator, which may result in a shorter development cycle. For example, a shorter development cycle may occur for an initial design or for a port to a different platform conversion. This may allows developers to write applications for future architectures that are still being developed.

Figure 4:
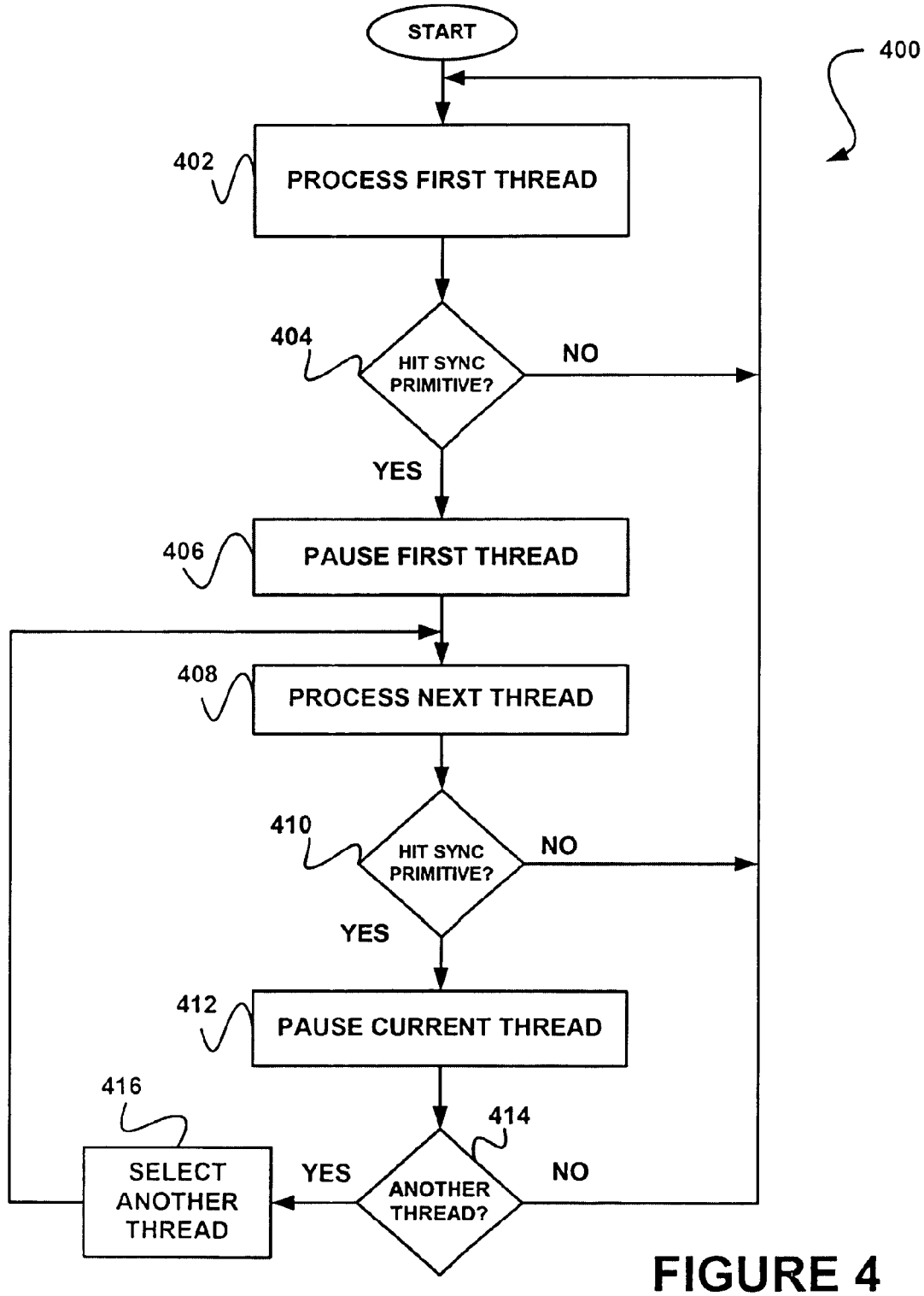
FIG. 4 shows a method for executing code, adapted to execute utilizing a first processor, utilizing a second processor, in accordance with one embodiment.

FIG. 4 shows a method 400 for executing code, adapted to execute utilizing a first processor, utilizing a second processor, in accordance with one embodiment. As an option, the present method may be implemented in the context of the details of FIGS. 1-3. Of course, however, the method may be implemented in any desired environment. Furthermore, the aforementioned definitions may apply during the present description.

As shown, a first thread associated with the second processor is processed. See operation 402. It is then determined if a synchronization primitive is hit. See operation 404. If the synchronization primitive is not hit, the processing of the first thread continues.

If the synchronization primitive is bit, the processing of the first thread is paused. See operation 406. Subsequently, the next thread is processed. See operation 408. As shown further, it is again determined if the synchronization primitive is hit. See operation 410.

If the synchronization primitive is not hit, the processing of the thread continues, if the synchronization primitive is hit, the processing of the current thread is paused. See operation 412. It is then determined whether another thread is available for processing. See operation 414. If another thread is available for processing, that thread is selected and processing begins on the new thread. See operation 416.

If another thread is not available, the first thread may then again be processed. In this way, the second processor may manage a plurality of parallel threads by executing at least a portion of a first parallel thread, pausing the execution, and executing a second parallel thread. Furthermore, at least a portion of the second parallel thread may be processed, and execution paused until the execution of at least the portion of the first parallel thread is complete. Thus, multiple threads of a parallel processing architecture may be synchronized by alternating execution.

Figure 5:
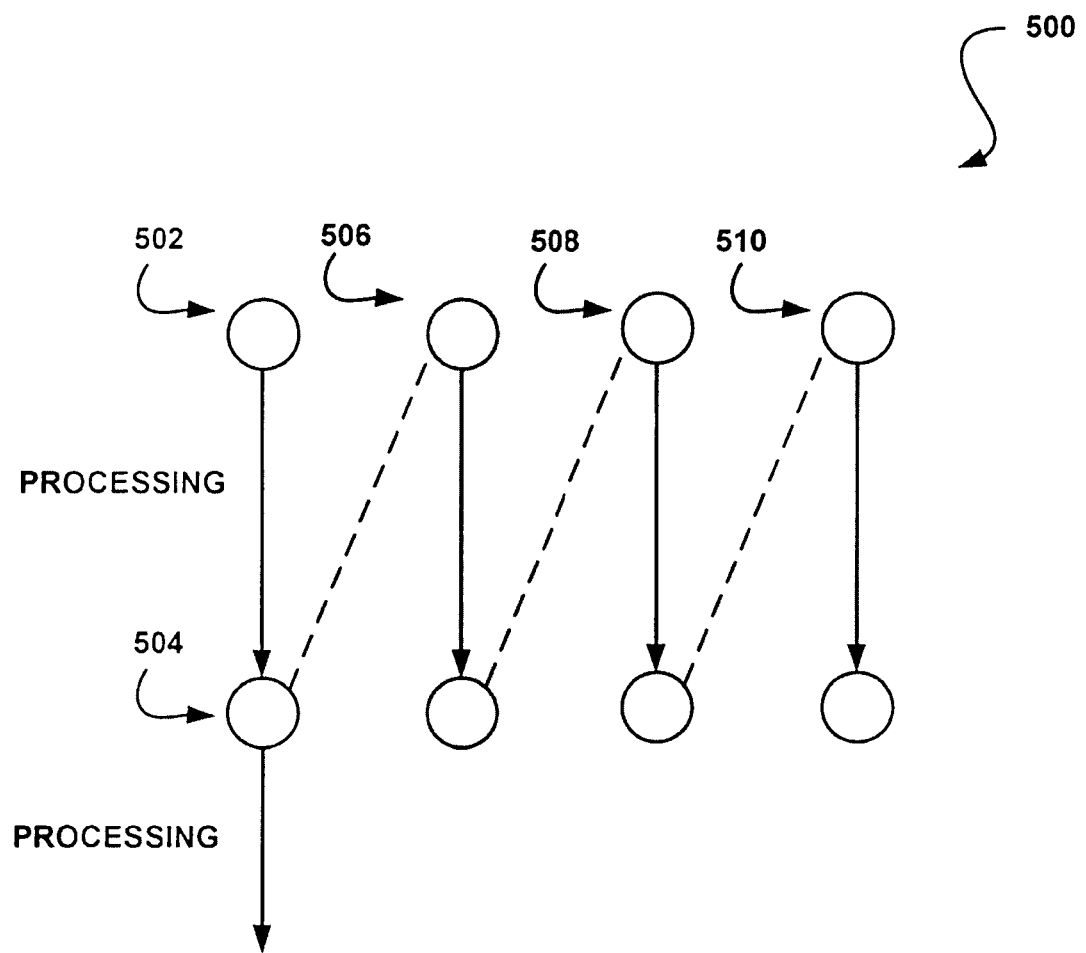
FIG. 5 shows a method for executing code, adapted to execute utilizing a first processor, utilizing a second processor, in accordance with another embodiment.

FIG. 5 shows a method 500 for executing code, adapted to execute utilizing a first processor, utilizing a second processor, in accordance with one embodiment. As an option, the present method may be implemented in the context of the details of FIGS. 1-4. Of course, however, the method may be implemented in any desired environment. Again, the aforementioned definitions may apply during the present description.

As shown, a first thread 502 associated with a parallel processing architecture including a plurality of threads is processed until it is determined that a synchronization primitive 504 is reached. If a synchronization primitive is reached, processing of a second thread 506 included in the plurality of threads is initiated.

If the second thread reaches the synchronization primitive, processing on a third thread 508 is initiated. Once the third thread reaches the synchronization primitive, a forth thread 510 is processed. This technique is continued until no other threads are available for processing.

When no other threads are available for processing the processing on the first thread continues. The processing of the first thread may be completed or processed until a second synchronization primitive is reached. This may continue until all threads included in the parallel processing architecture have been fully processed.

It should be noted that any number of threads may be included in the parallel processing architecture, depending on the system. Furthermore, it should be noted that any number of steps may be implemented to achieve complete processing of a thread. For example, a thread may be paused multiple times to ensure thread synchronization, before that thread is fully processed.

Figure 6:
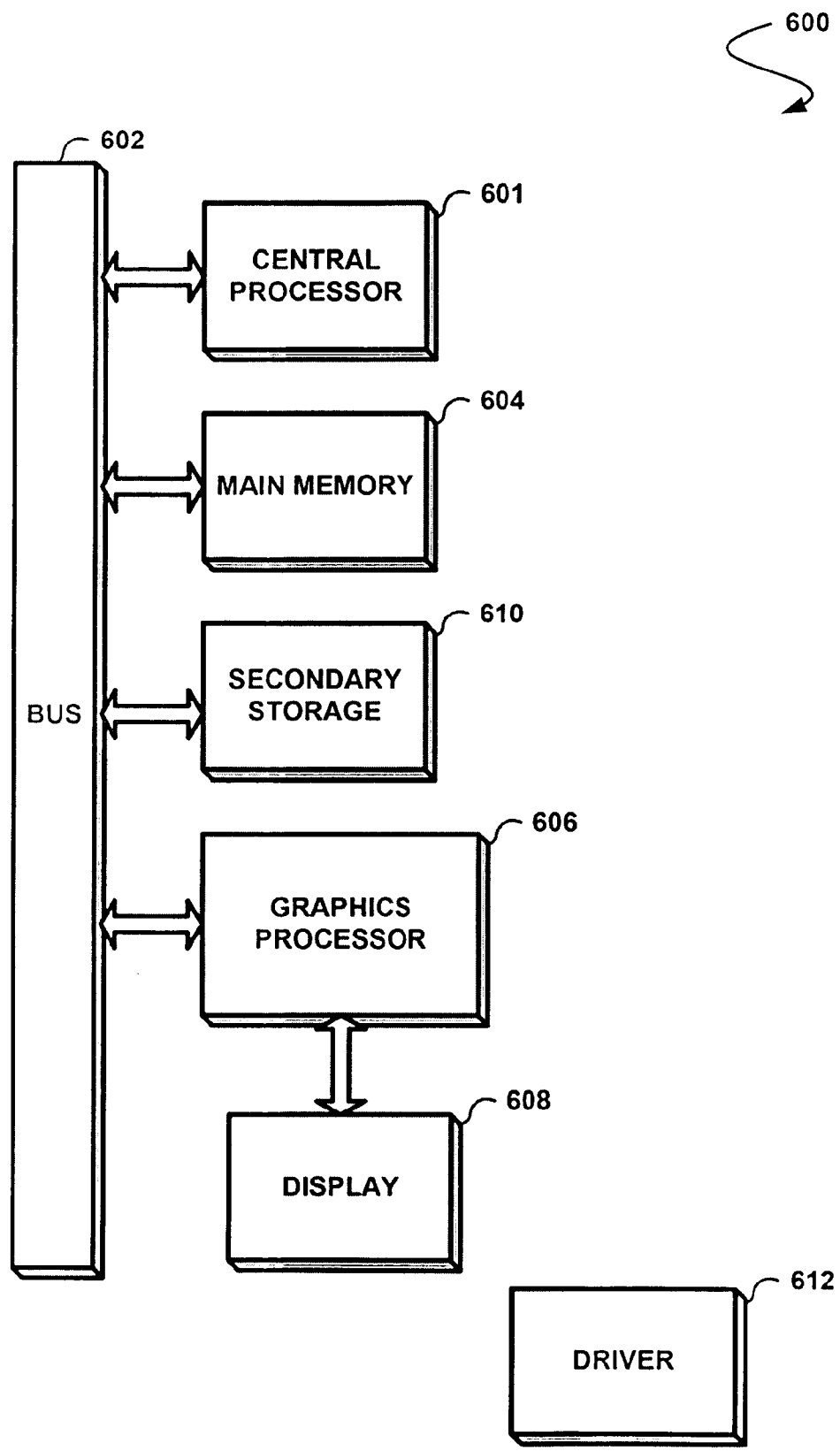
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system is provided including at least one host processor 601 which is connected to a communication bus 602. The system also includes a main memory 604. Control logic (software) and data are stored in the main memory which may take the form of random access memory (RAM).

The system also includes a graphics processor 606 and a display 608, i.e. a computer monitor in one embodiment, the graphics processor may include a plurality of shader modules, a rasterization module, etc. Each of the foregoing, modules may even be situated on a single semiconductor platform to form a graphics processing unit.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit and bus implementation. Of course, the various modules may also be situated separately or in various combinations of semiconductor platforms per the desires of the user.

The system may also include a secondary storage 610. The secondary storage includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory and/or the secondary storage. Such computer programs, when executed, enable the system to perform various functions. Memory, storage and/or any other storage are possible examples of computer-readable media.

In one embodiment, the architecture and/or functionality of the various previous figures may be implemented in the context of the host processor, graphics processor, an integrated circuit (not shown) that is capable of at least a portion of the capabilities of both the host processor and the graphics processor, a chipset (i.e. a group of integrated circuits designed to work and sold as a unit for performing related functions, etc.), and/or any other integrated circuit for that matter. Further, the functionality of the various previous figures may, in one possible embodiment, be implemented in any of the foregoing integrated circuits, under the control of a driver 612.

Still yet, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, lap-top computer, and/or any other type of logic. Still yet, the system may take the form of various other devices including, but not Hunted to a personal digital assistant (PDA) device, a mobile phone device, a television, etc.

Further, while not shown, the system may be coupled to a network [e.g. a telecommunications network, local area network (LAN), wireless network, wide area network (WAN) such as the Internet, peer-to-peer network, cable network, etc.) for communication purposes.

While various embodiments have been described, above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a computer readable medium, comprising:
    computer code for identifying code adapted to execute utilizing a first processor;
    computer code for compiling the code for executing the code utilizing a second processor that is different from the first processor and includes a central processing unit, the compiled code for execution by the second processor being linked against a library that emulates an execution model of the first processor; and
    computer code for executing the compiled code utilizing the second processor, the compiled code executing as if the compiled code was executing utilizing the first processor due to the linking against the library that emulates the execution model of the first processor;
    wherein the first processor includes a general purpose graphics processing unit, and the compiling of the code includes translating the code adapted to execute utilizing the general purpose graphics processing unit into code adapted to execute utilizing the central processing unit of the second processor;
    wherein the translating of the code adapted to execute utilizing the general purpose graphics processing unit into the code adapted to execute utilizing the central processing unit of the second processor includes translating an extension of a computer language associated with the general purpose graphics processing unit into a standard computer language associated with the central processing unit.

2. The computer program product of claim 1, wherein a software stub is generated as a result of the translating.

3. The computer program product of claim 2, wherein the software stub includes a plurality of runtime calls.

4. The computer program product of claim 1, wherein the first processor includes a parallel processing architecture.

5. The computer program product of claim 1, wherein the execution of the compiled code utilizing the second processor includes managing a plurality of parallel threads.

6. The computer program product of claim 5, wherein the managing includes executing at least a portion of a first parallel thread.

7. The computer program product of claim 6, wherein the managing further includes pausing an execution of a second parallel thread until the execution of at least the portion of the first parallel thread is complete.

8. The computer program product of claim 1, and further comprising computer code for debugging the compiled code during the execution of the compiled code utilizing the second processor.

9. The computer program product of claim 8, wherein the debugging includes at least one of a real-time feature, an error message feature, and a simulation feature.

10. A method, comprising:
    identifying code adapted to execute utilizing a first processor;
    compiling the code for executing the code utilizing a second processor that is different from the first processor and includes a central processing unit, the compiled code for execution by the second processor being linked against a library that emulates an execution model of the first processor; and
    executing the compiled code utilizing the second processor, the compiled code executing as if the compiled code was executing utilizing the first processor due to the linking against the library that emulates the execution model of the first processor;
    wherein the first processor includes a general purpose graphics processing unit, and the compiling of the code includes translating the code adapted to execute utilizing the general purpose graphics processing unit into code adapted to execute utilizing the central processing unit of the second processor;
    wherein the translating of the code adapted to execute utilizing the general purpose graphics processing unit into the code adapted to execute utilizing the central processing unit of the second processor includes translating an extension of a computer language associated with the general purpose graphics processing unit into a standard computer language associated with the central processing unit.

11. The method of claim 10, and further comprising debugging the compiled code during the execution of the compiled code utilizing the second processor.

12. The method of claim 10, wherein the compiling is carried out by a compiler for compiling code adapted to execute on the second processor.

13. A system, comprising:
- a compiler operable to compile code adapted to execute utilizing a first processor, such that the code is capable of being executed utilizing a second processor that is different from the first processor and includes a central processing unit, the compiled code capable of being executed by the second processor being linked against a library that emulates an execution model of the first processor; and
- a debugger operable to debug the compiled code during the execution of the compiled code utilizing the second processor, the compiled code executing as if the compiled code was executing utilizing the first processor due to the linking against the library that emulates the execution model of the first processor;
- wherein the first processor includes a general purpose graphics processing unit, and the compiling of the code includes translating the code adapted to execute utilizing the general purpose graphics processing unit into code adapted to execute utilizing the central processing unit of the second processor;
- wherein the translating of the code adapted to execute utilizing the general purpose graphics processing unit into the code adapted to execute utilizing the central processing unit of the second processor includes translating an extension of a computer language associated with the general purpose graphics processing unit into a standard computer language associated with the central processing unit.

14. The system of claim 13, wherein the second processor remains in communication with memory and a display via a bus.

15. The computer program product of claim 1, wherein a debugger associated with the central processing unit debugs code associated with the general purpose graphics processing unit as a result of the translation of the extension of the computer language associated with the general purpose graphics processing unit into the standard computer language associated with the central processing unit.

* * * * *